(12) United States Patent
Bohn et al.

(10) Patent No.: US 6,257,615 B1
(45) Date of Patent: Jul. 10, 2001

(54) IMPACT PROTECTION DEVICE

(75) Inventors: Stephan Bohn, Goldbach; Ralph Frisch, Mömbris, both of (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/273,913

(22) Filed: Mar. 22, 1999

(30) Foreign Application Priority Data

Mar. 23, 1998 (DE) .......................................... 298 05 210 U

(51) Int. Cl.$^7$ .................................................. B60R 21/16
(52) U.S. Cl. .................... 280/728.2; 280/731; 200/61.54
(58) Field of Search ........................... 280/728.2, 728.3, 280/731; 200/61.54

(56) References Cited

U.S. PATENT DOCUMENTS

| | | | |
|---|---|---|---|
| 5,378,013 | 1/1995 | Warner | 280/728 |
| 5,508,482 * | 4/1996 | Martin et al. | 200/61.55 |
| 5,627,352 | 5/1997 | Suzuki et al. | 200/61.54 |
| 5,720,493 * | 2/1998 | Sugiyama et al. | 280/731 |
| 5,775,725 * | 7/1998 | Hodac et al. | 280/728.2 |
| 5,857,697 | 1/1999 | Heilig | 280/731 |
| 5,927,746 * | 7/1999 | Komiya et al. | 280/728.2 |
| 5,931,492 * | 8/1999 | Mueller et al. | 280/728.2 |
| 5,947,509 * | 9/1999 | Ricks et al. | 280/728.2 |
| 5,964,477 * | 10/1999 | Lehman | 280/728.3 |
| 5,971,430 * | 10/1999 | Niwa et al. | 280/731 |
| 6,029,992 * | 2/2000 | Vendely et al. | 280/728.2 |
| 6,036,223 * | 3/2000 | Worrell et al. | 280/731 |
| 6,062,592 * | 5/2000 | Sakurai et al. | 280/728.2 |
| 6,086,090 * | 7/2000 | Fischer | 280/728.2 |

FOREIGN PATENT DOCUMENTS

| | | |
|---|---|---|
| 4424475 | 2/1995 | (DE) . |
| 29519700 | 5/1996 | (DE) . |
| 0785107 | 7/1997 | (EP) . |
| 0822123 | 2/1998 | (EP) . |
| 2290267 | 12/1995 | (GB) . |

* cited by examiner

Primary Examiner—J. J. Swann
Assistant Examiner—L. Lum
(74) Attorney, Agent, or Firm—Tarolli, Sundheim, Covell, Tummino & Szabo L..L.P

(57) ABSTRACT

An impact protection device for motor vehicle drivers includes a steering wheel, an air bag module and a module cover. The steering wheel, the air bag module and the module cover each form a separate assembly unit. Two mounting studs project from the module cover towards the steering wheel. The module cover and the air bag module are connected to the steering wheel by means of the mounting studs. The mounting studs are attached to the steering wheel. Fastening means are provided on the end of each mounting stud. A washer of insulating material, a coil spring and a mounting flange of the module cover are clamped between the flange of the mounting stud and the fastening means. Support for an electrical switch contact is embedded in the washer of insulating material and a mass contact of an electrical switch is provided on the mounting flange of the module cover.

5 Claims, 1 Drawing Sheet

IMPACT PROTECTION DEVICE

The present invention relates to an impact protection device for motor vehicle drivers, including a steering wheel, an air bag module and a module cover.

BACKGROUND OF THE INVENTION

Such protection devices are usually arranged in a central portion of the steering wheel, i.e. above the location at which the steering wheel is connected to the steering column. In this arrangement, the lining facing the driver is formed by a module cover adapted both in appearance and feel to the surroundings of the steering wheel. The latter has a foamed plastic casing surrounding a steering wheel skeleton, the surface of which body is substantially non-porous and textured like leather.

If the module cover is not made by the same source, i.e. by the manufacturer of the steering wheel, it is difficult to texture the surface of the module cover such that it is not different in appearance and feel to that of the steering wheel surroundings. These technical difficulties may be practically eliminated when foam-casing the steering wheel skeleton and producing the module covers is single-sourced, it then being easy to ensure that components directly juxtaposed in the finished vehicle are produced from the same preproduct batch.

More recently, however, automotive manufacturers are increasingly demanding speedier final-assembly which is often only attainable by employing larger preassembled assembly units, these requirements also favoring production of the steering wheel single-sourced.

When, however, protection devices including steering wheel, air bag module and module cover are to be furnished as assembly units to the final assembly line, i.e. using a steering wheel having an integrated air bag, the steering wheel can no longer be mounted, as usual, by means of a nut screwed to the steering column since the already incorporated air bag module prevents access to a nut thus arranged. Other means thus need to be found for attachment of the steering wheel.

It is furthermore to be noted that the air bag module itself is made up of components which differ and as a rule are sourced from different manufacturers. When air bag modules for steering wheels are not fabricated by the steering wheel manufacturer, these modules, as assembly units, nearly always also include the module cover since the trend is towards larger assembly units and out-sourcing the assembly time involved.

In summary it can thus be established that although the desire for larger assembly units is understandable since they permit speedier assembly, this gives rise to other problems which are a disadvantage to the automotive manufacturers since it makes them more dependent on the manufacturer of the assembly units than they would care to be. If the assembly units involved, i.e. steering wheel, air bag module and module cover can be purchased from sources independent of each other, the manufacturer is able to benefit from, among other things, price advantages which are much higher than the then additional expense involved in final assembly. However, it is often the case that this freedom of choice does not exist, because at least air bag module and module cover are offered only as an assembled unit and because these assembly units are designed compatible with each other to such a degree that splitting them up would only be possible at prohibitively high expense.

BRIEF DESCRIPTION OF THE INVENTION

An object of the invention is to propose a protection device of the aforementioned kind enabling the steering wheel, the air bag module and the module cover to be sourced from differing manufacturers and for these parts to be then put together in final assembly. In so doing, of course, final assembly needs to be implementable as speedily as possible. In addition the assembly units need to be reliably interconnected in final assembly so that the reaction forces occurring on the air bag being activated may be handled with no problem. Finally, the achievement sought needs to satisfy all other design requirements and more particularly leave nothing to be desired as regards appearance and feel.

To achieve this object it is proposed in accordance with the invention that the steering wheel, the air bag module and the module cover each form a separate assembly unit and that at least two mounting studs are applied to the module cover which extend parallel to the steering wheel axis and which are configured to secure the module cover and the air bag module to the steering wheel, and which cooperate with fastening means bearing on the rear side of the steering wheel.

In this arrangement the mounting studs are expediently part of the module cover assembly unit which is installed in final assembly after the air bag module has already been arranged in the steering wheel. In so doing, the mounting studs simultaneously may serve to connect the air bag module to the steering wheel.

Further details of the invention will be discussed with reference to the embodiment shown in the drawings.

DETAILED DESCRIPTION OF THE INVENTION

Figure 1:
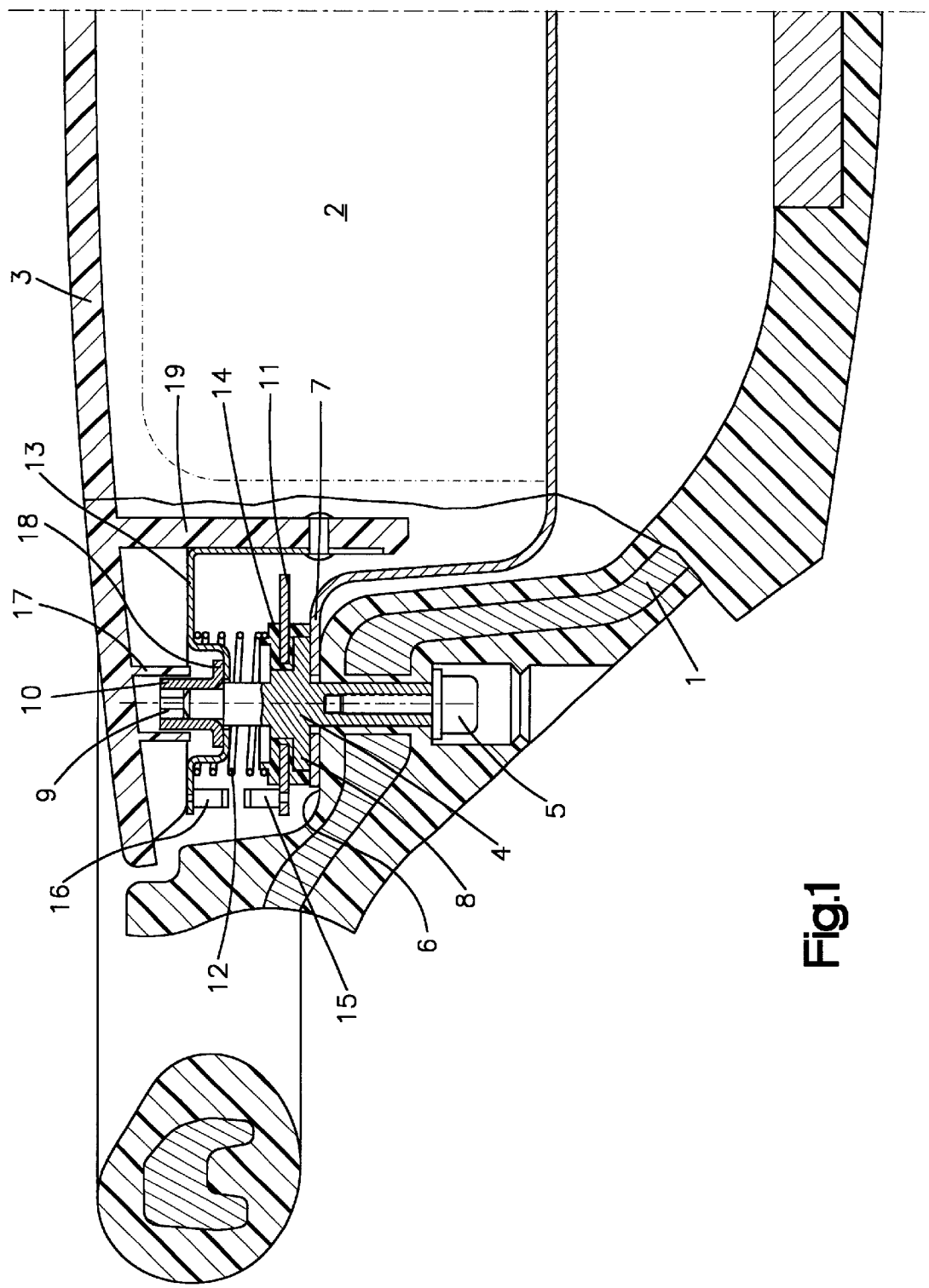
FIG. 1 is a partial section through a steering wheel with a fastening location, representing as separate assembly units a steering wheel 1, an air bag module 2 and a module cover 3 in the final assembly position.

The central component of the fastening location is a mounting stud 4 comprising at the steering wheel side a bore having a female thread, into which bore a stud 5 is screwed, supporting at the rear side of the steering wheel 1. Provided at the end, facing the driver, of the mounting stud 4 is a male thread with an end stop on which a fastening means 10 is screwed, the latter forming at the same time a means for positioning the module cover provided with recesses 17 which are attachable to the fastening means 10 at their ends. The actual fastening of the cover 3 with the mounting stud 4 is done via mounting flanges 13 clamped in place between the screw-mountable fastening means 10 and a radial flange 8 configured half way down the mounting stud 4 together with a spring element 12, a washer 11 of insulating material and a support 14 for the positive contact 15 of a horn actuator. The negative contact 16 is applied to the mounting flange 13. Disposed between the fastening means 10 and the mounting flange 13 is a further washer 18 of noise-dampening material.

The assembly unit module cover 3 is produced as follows: Firstly, the washer 11 of insulating material with the embedded support 14 for the positive contact 15 is fitted to the mounting stud 4. After this, the spring element 12 and the mounting flange 13 as well as the washer 18 are fitted and are secured to the mounting stud 4 by the fastening means 10, the fastening means being screwed to the end 9, at the cover side, of the mounting stud 4. Then, the module cover is attached and it is secured to the mounting flange 13 via a circumferential web 19 pointing towards the steering wheel 1, a rivet connection being provided in the case as shown.

Thus, all parts as shown in the fastening portion above the flange 8 at the mounting stud 4 belong to the module cover 3 assembly.

The air bag module 2 consists substantially of an inflator including an igniter and of a gas bag which may differ in design and are thus merely indicated by a contour line. Belonging further to the air bag module 2 in any case is a housing on which the mounting flanges 7 are configured or to which they are fixed, each of which comprise a through-hole for the mounting stud.

After the air bag module 2, as described, has been inserted in the steering wheel such that the through-holes in the mounting flanges 7 coincide with the through-holes for the mounting stud 4 in the steering wheel 1, the module cover assembly is inserted with the mounting stud, the mounting flanges 7 being clamped in place between the flanges 8 of the mounting stud 4 and the mounting surface areas 6 on the steering wheel 1.

Once the studs 5 have been screwed into the mounting stud 4 all three assembly units are firmly secured to each other.

It will be appreciated that splitting up a protection device into three separate assembly units and connecting them by means of mounting studs as depicted in the embodiment is not, of course, restricted to such embodiments in which the module cover 3, for actuating the horn contacts 15 and 16, needs to be movably arranged relative to the steering wheel in the direction of the steering wheel axis. Splitting up into three autonomous assembly units and the method of fastening as proposed may be put to use just as well in the less complicated case in which some other means of actuating the horn contacts is selected and in which the module cover may thus be disposed immovable relative to the steering wheel. In this case, the washer 11 of insulating material and the spring element 12 would be eliminated and the mounting flange 13 would be secured by the fastening means 10 so as to directly rest on the flange 8 of the mounting stud 4.

By splitting up the impact protection device into three autonomous assembly units as proposed, the automotive manufacturer now has the freedom of sourcing the three assembly units separately, it being particularly important in this respect that he is able to obtain a quote from all sources, irrespective of whether these are willing or able to also produce steering wheels and/or module covers. This may be especially of advantage to the automotive manufacturer when wanting to source the steering wheel and module cover assembly units from manufacturer A, but wishing to recourse to manufacturer B for the air bag modules. In this way he is able to combine an optimum appearance and feel of the surfaces of module cover and steering wheel surroundings with no restrictions whatsoever in sourcing the air bag modules. However, the gist of the invention also allows module covers to be obtained from a third source C when the steering wheel and air bag module assembly units are sourced from different manufacturers A and B.

What is claimed is:

1. An impact protection device for motor vehicle drivers including a steering wheel, an air bag module and a module cover, each of said steering wheel, air bag module and module cover forming a separate assembly unit, at least two mounting studs projecting from said module cover towards said steering wheel, said module cover and said air bag module being connected to said steering wheel by means of said mounting studs, and said mounting studs being attached to said steering wheel, said module cover for actuating a horn switch being shiftable towards said steering wheel and said module cover being biased to a first position by means of spring elements, each of said mounting studs having a flange, a fastening means screwable to an end of each of said mounting studs adjacent said cover, and a washer of insulating material, a coil spring and a mounting flange of said module cover being clamped between flange of said mounting stud and said fastening means.

2. The device as set forth in claim 1, wherein a support for an electrical switch contact is embedded in said washer of insulating material and a mass contact of said horn switch being provided on said mounting flange of said module cover.

3. The device as set forth in claim 2, wherein said fastening means form a means for plug-in engagement in recesses of said module cover.

4. The device as set forth in claim 1, wherein a washer of a noise-dampening material is disposed between said mounting flange of said module cover and said fastening means.

5. The device as set forth in claim 1, wherein said module cover is made of plastics and comprises a surrounding web pointing towards said steering wheel, with metallic mounting flanges secured to said web for connecting said module cover to said steering wheel by means of said mounting studs.

* * * * *